June 11, 1940.  E. J. BRUNNER  2,203,941
BULLDOZER MOUNTING
Filed July 22, 1938   2 Sheets-Sheet 1
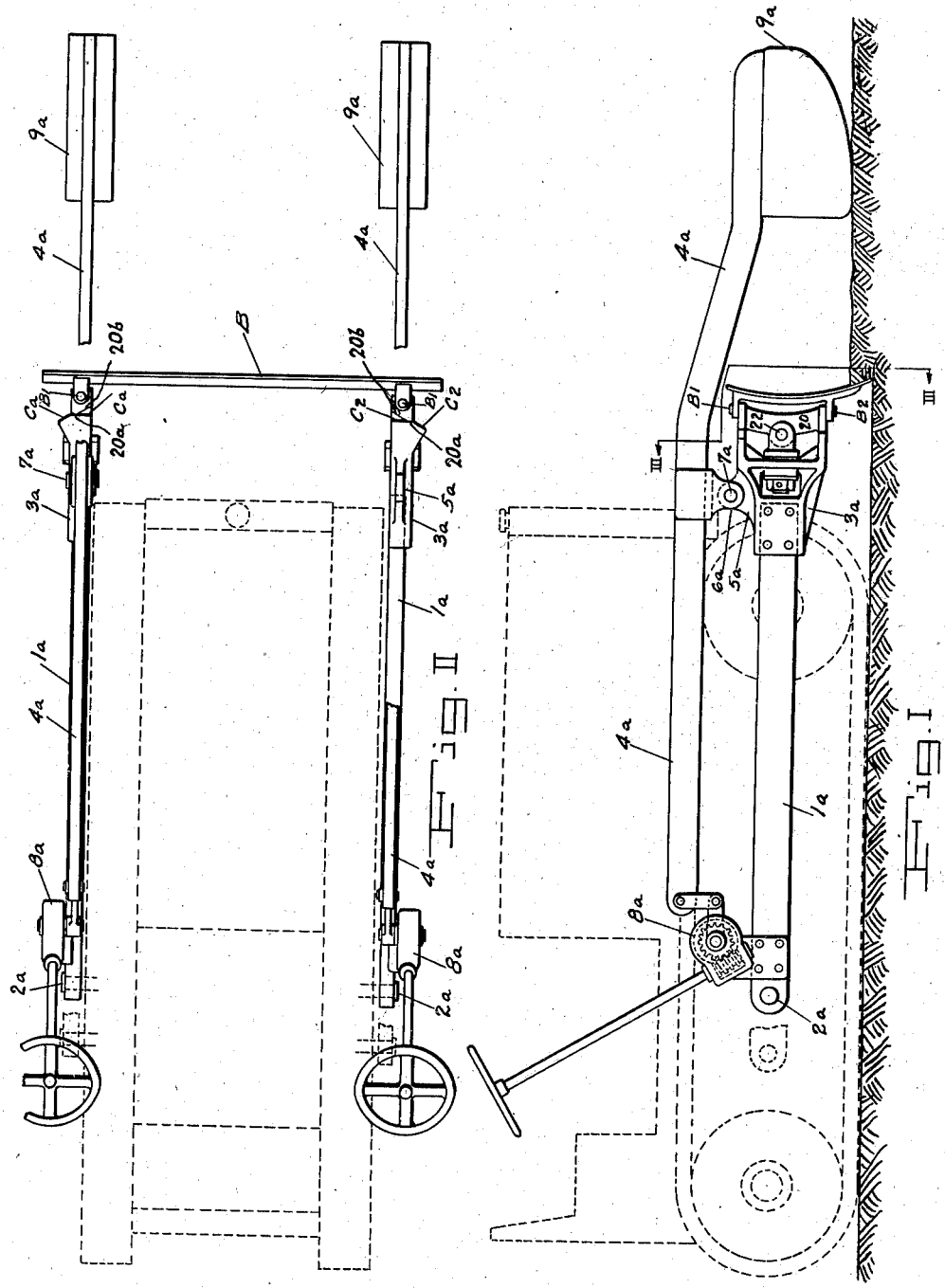
INVENTOR
Ernest J. Brunner
BY
G. F. McDougall
ATTORNEY June 11, 1940.　　　　E. J. BRUNNER　　　　2,203,941
BULLDOZER MOUNTING
Filed July 22, 1938　　　2 Sheets-Sheet 2
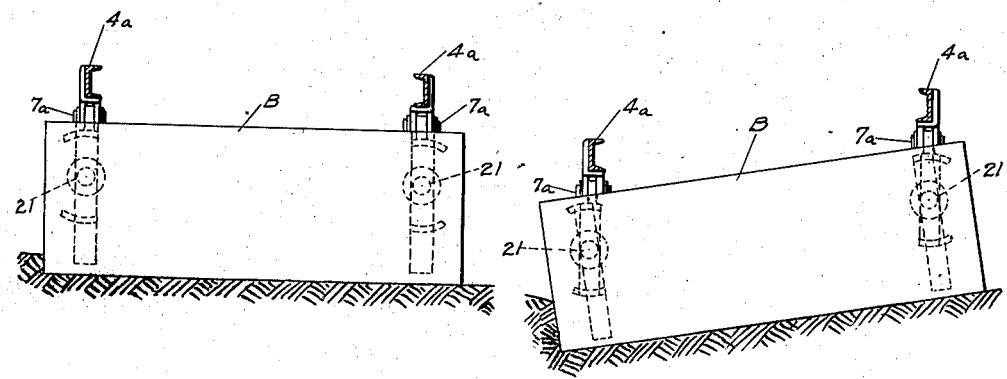
Fig. III　　　Fig. IV
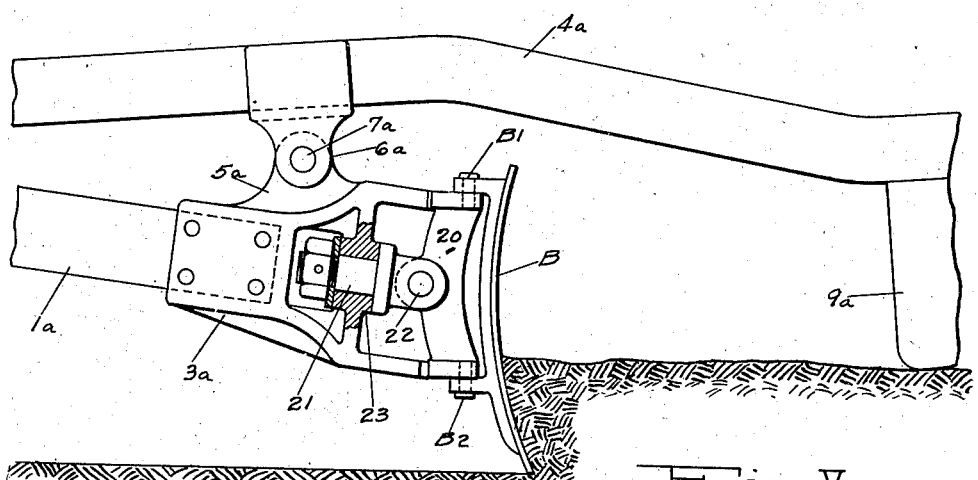
Fig. V
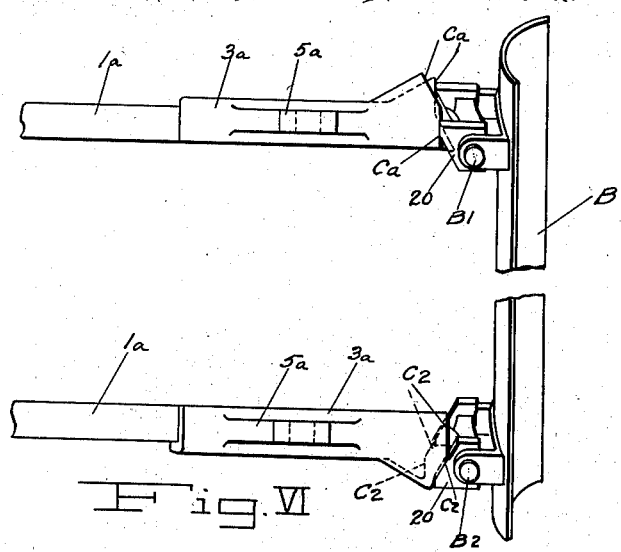
Fig. VI
INVENTOR
Ernest J Brunner
BY
G F McDougall
ATTORNEY Patented June 11, 1940

2,203,941

UNITED STATES PATENT OFFICE 2,203,941

BULLDOZER MOUNTING

Ernest J. Brunner, Eugene, Oreg.; Marie C. Brunner administratrix of said Ernest J. Brunner, deceased Application July 22, 1938, Serial No. 220,680

4 Claims. (Cl. 37—144)

This invention relates to scraping devices and particularly to the device known as a "bulldozer," being a blade scraper or grader mounted on the front end of a caterpillar type tractor, the invention being of the bulldozer mounting.

These bulldozers are made in various sizes, the largest at present being mounted on the front of a 100 H. P. Diesel tractor and used in road building, particularly in logging roads, being rugged and powerful enough to cut off a 5" green stump. Smaller machines are made for ditching in irrigation and drainage, and it is this latter type to which the present invention is most applicable.

In draining, it is frequently expedient to scrape a ditch a foot or less in depth, shallower than the top-soil, to drain land that would require several weeks for evaporation, using up the growing season. This can be done only by tilting the blade, which cannot be done with present art while maintaining the necessary rugged construction.

The objects of the present invention are first a blade mounting for a bulldozer that permits tilting the blade with respect to the tread of the tractor portion to cut a ditch in comparatively level ground.

A further object is a blade mounting for a bulldozer that supports the blade on both sides, front and rear, so that it will cut straighter than when supported on the tractor alone.

A further object is a blade adjusting means that gives the operator a substantial leverage to overcome the tremendous forces that resist change, while the blade is cutting.

Since a belt-tread tractor turns on about its center of gravity when traveling over uneven ground, a blade removed from the center of gravity, as on one end of the tool, will dig in at times and fail to cut at all at other times. It is an object of the invention to so support the blade that these objectionable tendencies are greatly improved.

These and other objects that will be immediately apparent to those familiar with the machine, constitute the purpose of the invention, the scope of which is pointed out in the claims hereto appended.

Drawings accompany and form a part of this specification in which—

Fig. I is a side view of a tractor, in dotted outline, equipped with a bulldozer blade B, mounted on an original design of mounting beam which I have called a shear-leg beam as an apt name for a new structure;

Fig. II is a plan view of Fig. I, showing that there are two independent mountings that are identical in mode of operation, but made right and left;

Fig. III is a section on the lines III—III of Fig. I;

Fig. IV is the same structure shown in Fig. III, but with the bulldozer blade tipped at an angle to the tread of a tractor upon which it is mounted, as will be hereinafter explained;

Fig. V is an enlarged end view of the bulldozer blade showing the mounting in greater detail with provision for tilting the blade without substantially changing its lead angle into the ground. The blade is tilted as on the left hand side of Fig. IV; and Fig. VI is an enlarged top plan view of Fig. IV, showing the blade B pitched downward below the horizontal at the left hand end, with the center of the blade broken away, the purpose of this view being to illustrate the cam action.

In the drawings, B is the bulldozer blade that may be set at right angles to the axis of a tractor upon which it is mounted, or originally set at an angle in either direction, right or left, as is customary, and may also be adjusted independently to throw either side up or down to cut angularly with respect to the general level of the ground, as indicated in Fig. IV, which is accomplished by virtue of the shear leg mounting referred to, in which $1a$ is the thrust beam portion, pivotally mounted on the side of the tractor frame by a pivot $2a$ which will be rigidly secured to take the load.

The thrust beam $1a$ carries a head $3a$ as a mounting for the blade B, at its forward end, which is more completely described hereinafter, which must be present to make the shear leg adjustments on the two sides independently effective.

The head $3a$ carries part of a pivotal mounting for the other member of the shear leg beam $4a$, which consists of the lug $5a$ including a pivot mounting $6a$ for the pivot pin $7a$, which affords a pivot or shear leg joint for the member $4a$, as shown in Fig. I.

Adjusting means $8a$ are shown mounted on the rear end of the member $1a$ and operatively connected between it and the member $4a$, that are effective to change the spacing apart of these two members, $1a$ and $4a$, which, as will be seen, regulates the depth of cut for the blade B.

The member $4a$ extends for a short distance ahead of the bulldozer blade B and has mounted thereon a shoe member $9a$ positioned to bear on the ground ahead of the blade B; hence it is seen that when the mounting is as shown in Fig. I, the blade B is supported at one end only by the shear leg beam elements which in turn are supported at the rear end by the pivot 2a and at the forward end by the shoe 9a, therefore any rocking of the tractor, or of the shoe, in passing over uneven ground will have a much modified effect on the blade B.

It is important that the adjusting means, whether it be worm and screw as diagrammatically shown, or hydraulic, or any other preferred means, be mounted on the beam members independently of the tractor. If mounted as diagrammatically shown, the operator will have a great leverage in his favor to move the blade and the general type of adjusting means shown will be found satisfactory.

The blade may be moved to secure angularity with respect to the longitudinal axis of the tractor, by moving the pivots 2a to different settings as shown and by virtue of the pintle mounting B1 and B2 at top and bottom blade mounting portion of the head 3a.

Each end of the blade B is provided with a thrust block 20 pivotally attached by the pins B1 and B2. These thrust blocks are right and left and are provided with straight and bevel thrust contact portions 20a and 20b, Fig. II, which bear against the cam surfaces Ca and C2.

When the blade is horizontal the straight portions 20a bear against the straight portions of the cams Ca and C2 (see Fig. II) and when the relative position of the blade is changed by lowering one end, the bearing shifts over to the angular portions of the cams and thrust blocks so that the angular portions at the lower end are together while the straight parts of the other end are together. This is shown in Fig. VI, which as noted is a top plan view of Fig. IV in which the lower half of the figure represents the left hand end of Fig. IV.

When it is remembered that the blade is raised and lowered by lifting the blade mounting bodily, it will be seen that such lifting would put a severe twisting strain on the blade B without the described cam structure, or something having a similar action, because the mounting necessarily has an arcuate motion when lifted.

The thrust block is pin connected to the eyebolt 21 by the pin 22, the eyebolt 21 being mounted turnably in the socket 23 of the head 3a as shown in section in Fig. V.

It will be immediately seen that the bulldozer blade can be raised or lowered at either end independently of any movement of the opposite end, or cooperatively by raising one end and lowering the other, to dig a ditch as shown in Fig. IV, for drainage purposes and when the draining is done, the soil can be thrown back into the cut and leveled off by a simple setting of the same machine. This versatility is of great advantage in irrigation work and so far as I know cannot be accomplished with any known bulldozer; hence the great advantages of a bulldozer cannot be utilized for such work. This type of joint is called a "universal" when the cams are omitted.

I consider the shear leg beam mounting for the bulldozer blade to be the element that makes this structure possible of utilization in the manner described, which is of course also dependent on the pivotal blade mounting and to a large extent on ability to shift the horizontal angle of the blade without greatly disturbing its cutting angle with respect to the ground. The pivotal mountings may be changed materially in form, provided the requisite flexible movement is provided for, but it is important that the shear leg beam be present, with its forward shoe, to support the bulldozer in proper cutting relationship to the ground.

Having fully disclosed my invention so that those familiar with the art may make and use it, what I claim as new and desire to secure by Letters Patent, is:

1. A bulldozer blade mounting for a tractor comprising a blade adapted to be pushed by a tractor, a mounting for the blade comprising pivotal supports permitting relative forward and back, up and down and limited pitch change movement of the blade at both ends thereof, thrust beams having one end made rigid with each mounting with the other end arranged for pivotal attachment to a tractor frame, a ground shoe suported ahead of the blade, shoe support beams pivotally attached to the blade mountings that extend rearwardly above the thrust beams and means for adjusting the ground engagement of the blade independently at each end comprising a device for forcibly changing the angle between the said beams.

2. In a bulldozer blade mounting of the character described, a blade member and shear leg beams operatively attached to each end thereof to support the said blade, the said shear leg beam including two beam members pivotally joined intermediate their ends, a blade support on the end of one beam, a shoe on the corresponding end of the other beam and means mounted between the two beams near their opposite ends effective to vary the relationship between the cutting edge of the blade and the bottom of the shoe.

3. A shear leg beam blade mounting for a bulldozer comprising a pair of beam members pivotally joined intermediate their ends without crossing, a shoe on the end of one beam, a blade mounting on the corresponding end of the other beam and means mounted between the opposite ends of said beams to forcibly change their spread.

4. In a shear leg beam mounting for a bulldozer blade ahead of a tractor, a thrust beam that is pivotally attachable to a tractor at one end and is provided with a blade tilting pivot at the other end with a blade mounted thereon, a tilting beam that is intermediately pivotally superposed on the thrust beam near the blade tilting pivot, a ground shoe that is carried by the tilting beam ahead of the blade and means between the rear ends of the beams for changing their spread.

ERNEST J. BRUNNER.